Sept. 23, 1969

P. R. RANSOM ET AL 3,469,185

ELECTRICAL TEST PROBE HAVING AN OFFSET
TIP AND LINE OF SIGHT THEREFOR

Filed Dec. 11, 1967

INVENTORS
TED C. DORSEY
PAUL R. RANSOM

BY

ATTORNEYS

United States Patent Office 3,469,185
Patented Sept. 23, 1969

3,469,185
ELECTRICAL TEST PROBE HAVING AN OFFSET TIP AND LINE OF SIGHT THEREFOR
Paul R. Ransom, 313 Topa Drive, Ojai, Calif. 93023, and Ted C. Dorsey, 4479 Westmont, Ventura, Calif. 93003
Filed Dec. 11, 1967, Ser. No. 689,657
Int. Cl. G01r 31/02
U.S. Cl. 324—72.5                9 Claims

ABSTRACT OF THE DISCLOSURE

An electrical instrument in the form of a pocket test probe, fountain pen-like in shape, which may be conveniently used for electric test purposes. The device has an offset probing point through which contact is made at an appropriate location with the aid of a line of sight extending from the offset probing point along the length of the body of the probe and a reading is taken through a magnifying glass positioned over an end dial. The probe includes a selector switch having indications which appear in the line of sight and a grounding connector lead located on a take-in reel. Readings are taken without breaking contact with the point under test.

---

The invention described herein may be manufactured and used by or for the Government of the United States of America for governmental purposes without the payment of any royalties thereon or therefor.

BACKGROUND OF THE INVENTION

Heretofore difficulty has been experienced in testing electrical equipment in the field especially in remote areas due to the inconvenience of carrying bulky conventional test devices to the equipment. Furthermore the test locale on specific equipment is often not in an accessible position and bulky conventional test equipment cannot readily be utilized.

The present invention provides a miniaturized testing device which is light in weight, small in size, convenient in shape and yet may embody any of several different types of test equipment, thus enabling many of such devices to be carried around at the same time.

Accordingly it is an object of the present invention to provide a means for conveniently testing electrical equipment in the field.

It is another object of the present invention to provide a means for testing equipment in awkward or inaccessible locales.

It is a further object of the invention to provide a small, portable pocket type pen-shaped device for testing electrical equipment.

Other objects, advantages, and novel features of the invention will become apparent from the following detailed description of the invention when considered in conjunction with the accompanying drawings.

DESCRIPTION OF THE PREFERRED EMBODIMENT

Figure 3:
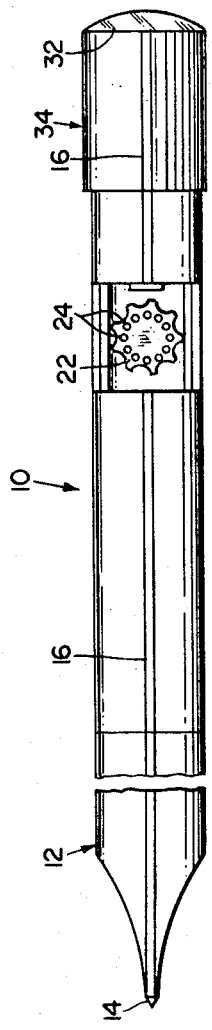
FIG. 3 is a top view of the invention illustrated in FIGURE 1.

Referring now to the drawings in detail, there is shown the electrical testing instrument of the present invention in the general overall shape of a fountain pen indicated generally as 10 which instrument has at one end a probe 12 with an off-center insulated test point 14 integral therewith. A sight line 16 extends from the point 14 of the probe 12 along the length of the instrument providing a unique sighting arrangement which facilitates accurate positioning of the test probe 12 during actual use thereof. A conventional test set 18 connecting with the probe 12 is embodied in the instrument 10 and is attached to the frame 20. It may be controlled by a selector switch 22 which has raised indications 24 that are arranged to appear in the line of sight 16. A ground connector 26 having a suitable terminal clip thereon is coiled on a conventional take-in reel 28 with a pull type latch and wind up mechanism similar to those employed in conjunction with window shades.

A meter 30 having an indicator dial at the end thereof for measuring test readings is positioned at the opposite end of the instrument 10 and a magnifying glass 32 may be positioned thereover. The magnifying glass can be housed in a cap 34 which may serve as a protective cover for the probe 12 on the opposite end of the instrument 10 when the instrument is not in use. The sight line 16 may also continue along the side of the cap 34.

Figure 2:
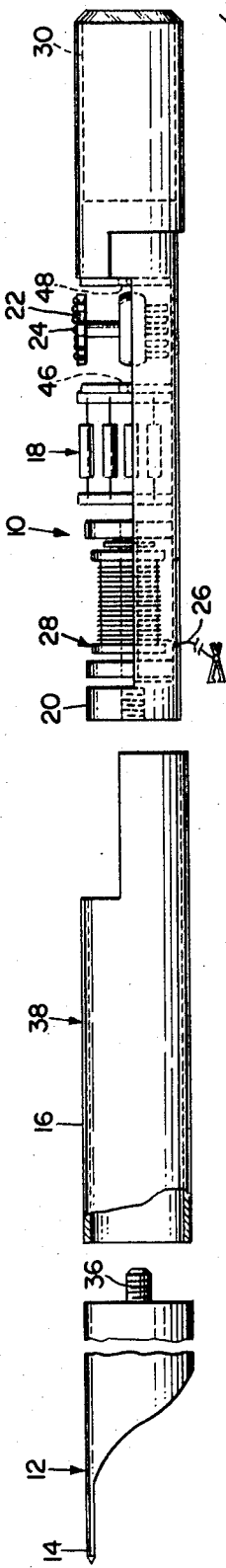
FIG. 2 is a partially exploded view of the invention illustrated in FIGURE 1.
Figure 1:
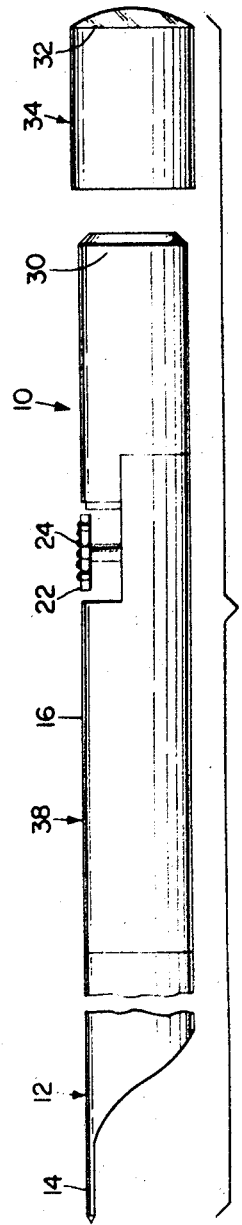
FIG. 1 is a side elevational view of the present device.
Figure 4:
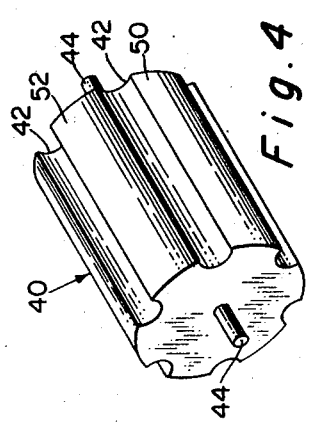
FIG. 4 is an enlarged, detailed view of a different type of selector switch which may be used in the present invention.

The selector switch 22 can be varied by substituting an elongated actuating cylinder 40 with peripheral grooves 42 for the switch 22 shown in FIGURES 1 and 2. It will be noted in FIGURE 4 that a central pin 44 extends from each end of the cylinder 40 and is adapted to fit into corresponding pin holes 46 and 48 located in the frame 20, and this knob may be suitably linked to the selector switch. Thus by rotating the actuating cylinder 40, specific settings of the cylinder can be easily performed while operating the instrument. Each position of the actuating cylinder 40 could be of different colors thereby facilitating the actual reading thereof. Thus land 50 could be red, land 52 could be green, etc. to correspond with selected switch positions and circuit valves.

The selector switch indications 24 also may be pairs of individually colored raised dots with each color identifying a specific setting of the selector switch 22. For example, a brown color could indicate a one-volt range and a green color could indicate a five-volt range, etc. The selected color indication is in the line of sight with the sight line 16 thereby permitting convenient determination as to the correct setting of the voltage range while taking readings of the circuit under test.

It will be noted that the probe 12 can be unscrewed at 36 from the frame 20 and that the sleeve casing 38 is slidably removable in order to afford easy access to the probe interior for repair or change of test sets 18 positioned within the instrument. It will be apparent that miniaturized and printed circuitry may be employed and that the test circuits may be interchangeable. Examples of various types of miniaturized test devices 18 that could be incorporated into the instrument 10 might be multimeters, signal generators, signal tracers, transistorized voltmeters and AC or DC voltmeters. These test devices are shown in the drawing as being positioned within the central portion of the instrument. However, they can be located within the probe 12 wherein they can be removed and new test devices installed by merely removing and replacing the said probe 12. Of course electrical connections may be effected between the parts by either contact rings or plug in elements.

The offset probe tip 12 may be replaced with a tip of different configuration if desired since it readily unscrews as shown.

It should now be obvious that in utilizing the test instrument of the present invention, the ground connection wire is first electrically connected to the device under test, thereafter point 14 of the probe 12 is placed into eletcrical contact with the selected equipment and the selector switch 22 is adjusted to provide high or low voltage range settings in accordance with the desired requirement and the result is read on the dial of meter 30.

The instrument 10 is in general quite small, thin and lightweight. As has been stated previously, it is preferably fountain pen shaped and its physical dimensions may be on the order of 0.5 inch in diameter and 6 inches in length. Thus, it is seen that several pocket instruments of the present invention having different test devices embodied therein can be conveniently carried around simultaneously. A pocket clip may be provided on the side of the instrument.

What is claimed is:

1. In a pocket electrical testing instrument wherein an elongated barrel is provided with a visual indicator and a multi position switch for varying the range of operation of operation of said instrument, the combination of:
   an electrically conductive probe positioned at one end of said barrel and having an off center test point;
   a sighting line extending from said off center test point along the length of the barrel and designed to aid in accurately positioning the test point at a selected location on electrical equipment to be tested;
   a test means embodied in said testing instrument and connected electrically to said probe, said test means designed for checking electrical circuit characteristics in said equipment to be tested;
   a ground connector mounted on said electrical test instrument and adaptable for connection to the equipment under test, said ground connector being electrically connected to said test means;
   a selector switch positioned on said barrel and adapted to electrically control the test means, said selector switch being adjustable to change the operating range of said test means and having indications thereon which appear in line with the sighting line;
   an electric indicator mounted on said electrical testing instrument;
   said indicator having a dial for visually displaying test results.

2. The electrical testing instrument of claim 1 wherein the said selector switch indications are each of different colors to afford ease in selecting the operating range prior to reading said indicator dial.

3. The electrical testing instrument as defined in claim 1 wherein the said probe is detachable.

4. The electrical testing instrument of claim 1 wherein a magnifying glass is positioned over said indicator dial and designed to facilitate the reading thereof.

5. The electrical testing instrument of claim 4 wherein the said magnifying glass is cup-shaped and is used as a protective cover for said probe point when the instrument is not in use.

6. An electrical testing instrument, pen-shaped in appearance and for use in checking electrical circuits comprising:
   a frame;
   a probe removably attached to one end of said frame and having an off center test point;
   a test means positioned on said frame and connected electrically to said probe, said test means designed to check a questioned electrical circuit;
   a take-up reel mounted on said frame;
   a ground connector attached to said take-up reel and adapted to be coiled thereon, said ground connector being electrically connected to said test means for completion of said questioned electrical circuit;
   a selector switch positioned on said frame for controlling the said test means, said selector switch being adjustable to select the voltage range and having raised indications thereon;
   a sleeve casing designed to cover the frame and provide protection for the devices positioned thereon, said sleeve having a cut-away portion to permit exposure of said selector switch;
   an indicator mounted on the end of said frame opposite to that on which said probe is attached;
   an indicator dial mounted on said indicator and adapted to visually display the test results; and
   a magnifying glass positioned over said indicator dial and designed to aid in the reading thereof.

7. The electric testing instrument of claim 6 wherein a sight line is positioned to extend from the tip of said probe and along the entire length of said sleeve cover, said selector switch being in the line of sight, thus a convenient determination for the correct positioning of said probe is provided.

8. The electrical testing instrument of claim 6 wherein the said selector switch indications are each of different colors to afford ease in selecting the voltage range prior to reading said indicator dial.

9. The electrical testing instrument of claim 6 wherein the said magnifying glass is cup-shaped and is used as a protective cover for said probe test point when the instrument is not in use.

References Cited

UNITED STATES PATENTS

| | | |
|---|---|---|
| 2,547,248 | 4/1951 | Bartholomew. |
| 2,552,981 | 5/1951 | Lamp. |
| 2,790,144 | 4/1957 | Silho _____ 324—72.5 |
| 2,916,699 | 12/1959 | Eisenberg _____ 324—72.5 |
| 3,046,476 | 7/1962 | McFarland _____ 324—72.5 XR |
| 3,193,765 | 7/1965 | Bevins _____ 324—149 |
| 3,196,217 | 7/1965 | Petrina _____ 324—72.5 XR |
| 3,287,642 | 11/1966 | Simkins _____ 324—149 |

RUDOLPH V. ROLINEC, Primary Examiner

E. L. STOLARUN, Assistant Examiner